3,006,929
Patented Oct. 31, 1961

3,006,929
1-METHYL-17-ALKYL-19-NORTESTOSTERONES
Frank B. Colton, Chicago, Ill., and Daniel Lednicer, Durham, N.C., assignors to G. D. Searle & Co., Chicago, Ill., a corporation of Delaware
No Drawing. Filed Sept. 24, 1957, Ser. No. 685,806
1 Claim. (Cl. 260—397.4)

The present invention relates to a new group of highly potent orally active progestational agents and, more particularly, to those derivatives of 1-methyl-19-nortestosterone containing in the 17-position a lower alkyl radical containing at least two carbon atoms.

These compounds can be represented by the general structural formula

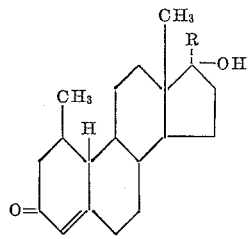

wherein R is a lower alkyl radical containing at least two carbon atoms such as ethyl, straight and branched-chain propyl, butyl, pentyl, or hexyl.

One of the applicants has shown in his U.S. Patent 2,721,871 that the corresponding compounds lacking the 1-methyl group are highly potent anabolic and hypotensive agents. The applicants have now found that by the introduction of a 1-methyl group most of the anabolic and the hypotensive action is lost, but that the compounds afford very highly potent oral progestational agents. The combination of the high progestational activity and the very low order of androgenicity and anabolic activity also distinguishes the claimed compounds from compounds corresponding to the above structural formula in which R is a methyl group.

The compounds of this invention are conveniently prepared by the isomerization of a 1-methyl-3-oxo-17α-alkyl-5(10)-estren-17-ol under the influence of a proton transfer agent which can be alkaline, as in the case of sodium hydroxide in aqueous methanol, or acidic, as in the case of hydrochloric acid used in aqueous methanol; in this isomerization the double bond migrates from the 5—10 position to the 4—5 position. An alternate synthesis uses as the starting material the 1-methyl-17-alkenyl-19-nortestosterone which is reduced by use of hydrogen in the presence of a noble metal catalyst, such as palladium, or a reduction catalyst such as Raney nickel.

The following examples are illustrative of the invention but are not to be construed as limiting it in spirit or in scope. Quantities are indicated in parts by weight.

*Example 1*

A mixture of 200 parts of diethylene glycol dimethyl ether, 10 parts of diethylene glycol monoethyl ether and 35 parts of potassium hydroxide is heated to refluxing and then chilled. Under vigorous stirring acetylene is bubbled through the ice-cooled suspension for 20 minutes after which 5 parts of 1-methylestrone 3-methyl ether are added to the slurry. Acetylene is bubbled through the stirred reaction mixture for 5 additional hours. The reaction mixture is then poured into water and the precipitate is collected on a filter and recrystallized from aqueous methanol to yield 17-ethynyl-1-methylestradiol 3-methyl ether melting at about 128.5–131° C.

A suspension of 0.41 part of a 5% palladium-on-charcoal catalyst in a solution of 4.1 parts of 17-ethynyl-1-methylestradiol 3-methyl ether in 100 parts of dioxane is shaken in a low pressure hydrogenation apparatus. After cessation of the hydrogen uptake, the catalyst is removed by filtration and the product is precipitated in water. The precipitate is collected on a filter and recrystallized from aqueous methanol to yield 17-ethyl-1-methylestradiol 3-methyl ether melting at approximately 148–150° C.

To a solution of 1.5 parts of 17-ethyl-1-methylestradiol 3-methyl ether in 32 parts of ether are added 160 parts of liquid ammonia and, in the course of 10 minutes, 2 parts of lithium with stirring. Then a 50% solution of ethanol in ether is added to the dark two-phased reaction mixture until disappearance of the color. The ammonia is allowed to boil off and water is added. The organic layer is separated, washed to neutrality with water, dried over sodium sulfate and evaporated under vacuum. The residue is permitted to stand for two hours with 70 parts of methanol, 4 parts of water, and 2.9 parts of concentrated hydrochloric acid. The precipitate obtained by pouring the methanolic solution in water is collected on a filter, dried and triturated with 5 parts of ether. Recrystallization from ethanol yields 17-ethyl-1-methyl-19-nortestosterone melting at about 198–200° C.

*Example 2*

To a stirred mixture of 8.5 parts of magnesium in 140 parts of ether there are added 5 parts of allyl bromide in 15 parts of ether. Then, in the course of 45 minutes, a mixture of 22 parts of 1-methylestrone 3-methyl ether in 95 parts of allyl bromide in 630 parts of ether are added. After 3 hours of refluxing the mixture is cooled to 0° C., washed repeatedly with 10% ammonium chloride solution and then with water, dried over anhydrous sodium sulfate, filtered and evaporated. The residue is taken up in ether. The ether solution is partially concentrated and diluted with petroleum ether. The precipitate is collected on a filter.

A mixture of 11.6 parts of the 1-methyl-3-methoxy-17α-allyl-1,3,5(10)-estratrien-17-ol thus obtained, and 3 parts of charcoal containing 5% palladium in 160 parts of ethanol is hydrogenated until 1 mole of hydrogen has been absorbed. The mixture is then filtered through filter aid and the filtrate is evaporated under vacuum. The residue is crystallized from a mixture of ether and methanol. To a stirred mixture of 6 parts of the 1-methyl-3-methoxy - 17α - propyl-1,3,5(10)-estratrien-17-ol thus obtained in 500 parts of ammonia and 140 parts of ether, 7 parts of lithium are added in the course of 20 minutes. The mixture is stirred for 30 minutes after which 46 parts of ethanol are added dropwise in the course of an hour. Stirring is continued until all of the ammonia has disappeared. Then water is added and the ether layer is separated, washed with water, dried over anhydrous sodium sulfate, filtered and evaporated. A mixture of the 17α-propyl-3-methoxy-2,5(10)-estradien-17-ol (purified by methanol crystallization), 320 parts of methanol, 80 parts of water, and 18 parts of concentrated hydrochloric acid is refluxed for 5 minutes and then permitted to stand for 15 minutes in hot water. A sufficient amount of hot water is added until the mixture becomes turbid. Upon standing, 1-methyl-17-propyl-19-nortestosterone precipitates which is crystallized from a mixture of acetone and petroleum ether. The ultraviolet absorption spectrum shows a maximum at 241 millimicrons with a molecular extinction coefficient of about 16,500.

*Example 3*

To a stirred suspension of 16.8 parts of 1-methylestrone 3-methyl ether in 300 parts of ether there is added a solution of butyl lithium prepared from 115 parts of 1-bromobutane and 6.7 parts of lithium in 600 parts of ether. Stirring is continued for an hour after which the mixture is decomposed with methanol and dilute sulfuric acid and extracted with ether. This extract is washed with saturated sodium chloride solution, dried over anhydrous sodium sulfate, filtered and evaporated under nitrogen. The residue is crystallized from methanol and water. The resulting 1-methyl-3-methoxy-17α-butyl-1,3,5(10)-estratrien-17β-ol is converted to the 1-methyl-17α-propyl-3-methoxy-2,5(10)-estradien-17-ol by treatment with lithium and ammonia according to the preceding example and the product is isomerized also by the procedure of the preceding example to yield 1-methyl-17-butyl-19-nortestosterone. The infrared absorption spectrum of this compound shows maxima at 2.8, 6.0, and 6.2 microns.

What is claimed is:

1-methyl-17-ethyl-19-nortestosterone which melts substantially at 200° C.

References Cited in the file of this patent

UNITED STATES PATENTS

| | | |
|---|---|---|
| 2,721,871 | Colton | Oct. 25, 1955 |
| 2,774,771 | Djerrassi | Dec. 18, 1956 |